July 26, 1960 R. H. BETER ET AL 2,946,957

SIGNAL AMPLIFIER SYSTEM

Filed March 10, 1955

INVENTORS
RALPH H. BETER
MORRIS RUBINOFF
BY
[signature]
ATTORNEY 2,946,957

SIGNAL AMPLIFIER SYSTEM

Ralph H. Beter, Philadelphia, and Morris Rubinoff, Sharon Hill, Pa., assignors to Philco Corporation, Philadelphia, Pa., a corporation of Pennsylvania Filed Mar. 10, 1955, Ser. No. 493,366

6 Claims. (Cl. 328—53)

The present invention relates generally to amplifier circuits and more particularly to circuits for amplifying and gating regularly occurring pulse signals.

Certain sections of electronic digital computers now in use process only pulses which occur, if at all, at known fixed times. A first class of circuits merely amplify a weak signal without changing its information content, a second class of circuits change the polarity of the signal, with or without amplification, while still a third class of circuits may combine two or more pulses or pulse series to provide a new pulse or pulse series which represents information not present in the original pulse series. Circuits of the first class are generally known as amplifiers and those of the second class are generally known as inverters. Coincidence circuits or gate circuits or buffer circuits account for a large portion of the third class of circuits. It will be recognized that all three forms of circuits are also found in electronic devices other than digital computers. In all of the types of circuits mentioned above, one of the basic elements around which the circuits are built is the vacuum tube amplifier stage. It is conventional practice to supply the pulses to be amplified or combined to one or more grids of one or more vacuum tubes which have the anodes thereof returned to a source of direct potential through a load impedance for each tube. In many instances the pulse signals drive the amplifiers into heavy conduction thus placing a heavy load on the source of anode supply potential. Decoupling networks are often required to prevent signals supplied to one amplifier stage from adversely affecting the operation of other amplifier stages.

As suggested above, the combination of two or more pulses or pulse series is usually accomplished in a gate circuit or coincidence circuit. One common form of coincidence circuit employs an amplifier tube having two or more signal grids. One series of pulses is supplied to one control grid and the second series of pulses is supplied to the other control grid. Note that three input leads are required for such an arrangement; one lead for the anode supply and one for each signal.

Transistor circuits have been developed which will perform the same functions as circuits employing triode vacuum tubes. However, it is difficult and sometimes impossible to construct the transistorized equivalent of a circuit employing a multigrid tube using only a single transistor.

Therefore it is an object of the present invention to provide a novel amplifier circuit which does not require the use of decoupling filters in the power supply leads.

It is a further object of the present invention to provide a novel circuit in which the number of input leads is less than the number required for conventional circuits.

Still another object of the invention is to provide a novel circuit requiring fewer control elements.

A further object of the invention is to provide a novel transistor circuit which is the equivalent of a circuit employing a multigrid vacuum tube.

Another object of the invention is to provide a novel transistorized gate circuit which is capable of providing results not heretofore obtainable in circuits employing a single active element.

In general these and other objects of the invention are achieved by employing a pulse type power supply in place of the usual source of direct potential or, alternatively, of employing one of the signals to be processed as the anode supply of the amplifier stage while impressing another signal on a control element in the usual manner. Means are provided for storing output signals during inactive periods of the amplifier stage.

For a better understanding of the invention together with other and further objects thereof reference should now be made to the following detailed description which is to be read in conjunction with the accompanying drawings in which.

Figure 1:
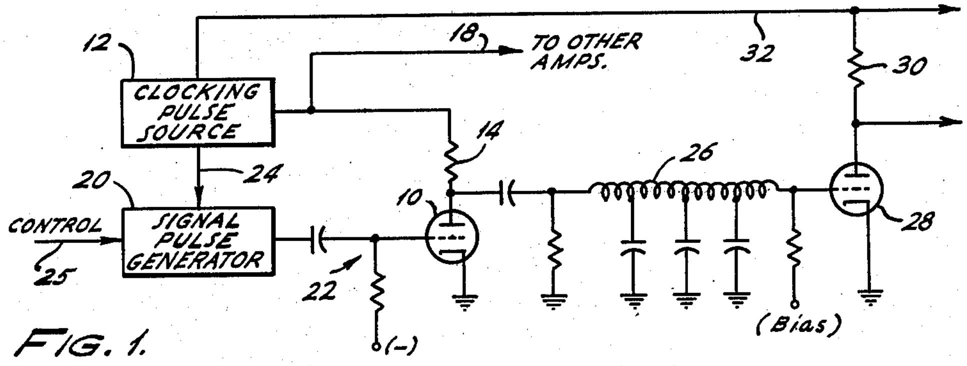
Fig. 1 is a diagram, partially in block form, of one preferred embodiment of the invention.

In Fig. 1 a triode vacuum tube 10 is supplied with anode potential from clocking pulse source 12. This connection is made through an anode load impedance 14. A lead 18 is shown in Fig. 1 to illustrate that the pulses supplied to tube 10 may serve also as the source of anode supply potential for other amplifier stages.

The signals to be amplified are supplied to the control grid of tube 10 from signal pulse generator 20 by way of the resistor-capacitor coupling network 22. A negative bias source, schematically represented by the minus sign (—) in Figure 1, is provided for biasing the grid of tube 10 below cut off potential. Generator 20 of Fig. 1 may be any one of the various sources of signals which require amplification. In one instance it may be a large section of a digital computer including several hundred components while in another instance it may comprise a simple encoder circuit or a gated amplifier stage including only two or three components. A connection 24 is shown from clocking pulse source 12 to signal pulse generator 20 to indicate diagrammatically that the generator 20 may be controlled so that signals appear at the output thereof only in time coincidence with the signals supplied by clocking pulse source 12. If this connection is not provided the amplifier stage including tube 10 will function as a selective gate circuit which passes only those signals in the output of signal pulse generator 20 which do occur in time coincidence with the signals supplied by clocking pulse source 12. It should be noted that the use of the clocking pulses as the anode supply pulses reduces by one the number of inputs required in the coincidence amplifier stage. Signals may be supplied to pulse generator 20 by way of lead 25 to control the nature of the output signal of generator 20. This control may take the form of suppressing pulses which would normally appear in the output of generator 20 in the absence of such control.

The signal appearing at the anode of tube 10 is supplied to the control grid of a second amplifier stage through a delay network 26. For reasons which will appear presently, delay network 26 should have a delay equal to an integral multiple, including the first, of the repetition period of source 12. In other embodiments of the invention capacitors, multivibrators or other delay or storage elements may be employed to store or maintain the signal until the signal is no longer needed by the following stage. Furthermore additional gating operations may be performed in the coupling network connecting tube 10 to tube 28; through additional circuits associated with the control grid of tube 28 or through circuits associated with additional control grids of tube 28. The manner in which such gating operations can be performed is well within the knowledge of the worker in the computer art and, for this reason, we have chosen to illustrate the invention in its simplest form.

The second amplifier stage is represented in Fig. 1 by a triode vacuum tube 28 having a load impedance 30 connecting its anode to a second lead 32 from pulse source 12. The grid of tube 28 is biased at approximately cut-off potential by the source schematically represented by the legend "BIAS."

Figure 2:
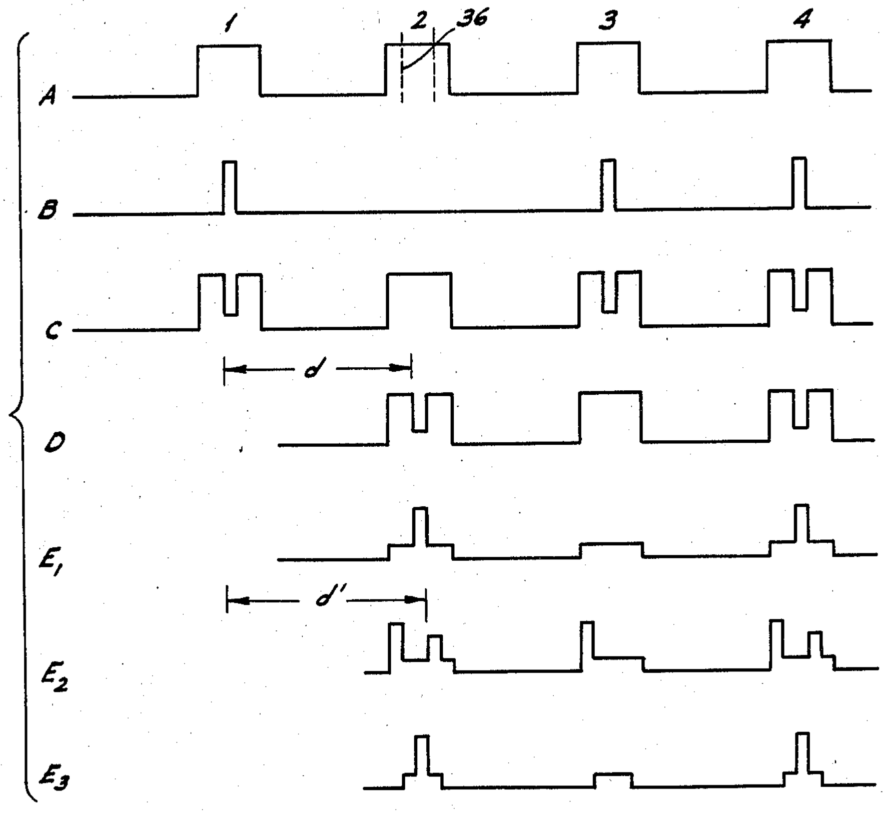
Fig. 2 is a series of waveforms which illustrate the operation of the system of Fig. 1.

The operation of the system of Fig. 1 will now be explained with reference to Fig. 2. In Fig. 2 waveform A represents the pulse signals supplied by source 12 to the amplifier stage including tube 10. The pulses supplied by source 12 are of sufficient amplitude to supply the normal anode potential to tube 10. With some types of subminiature tubes now used in digital computers the amplitude of the pulses may be of the order of 28 volts.

Waveform B in Fig. 2 represents the signals appearing at the output of generator 20. It has been assumed arbitrarily that a pulse signal appears in the output of generator 20 for each of the first, third, and fourth pulses supplied by source 12 but that no pulse appears at the output of generator 20 in time coincidence with the second pulse from source 12. As shown in Fig. 2 the pulses supplied by source 12 are of greater duration than the signals supplied by generator 20.

Waveform C represents the signal appearing at the anode of tube 10. Note that for pulses 1, 3 and 4 of waveform A, the potential at the anode of tube 10 first rises as the pulse is supplied by source 12, then falls as the grid of tube 10 becomes positive in response to the pulse supplied by generator 20, again goes positive as the pulse from generator 20 terminates, and finally falls to its original value at the termination of the pulse from source 12.

Waveform D represents the signal at the grid of tube 28. Waveform D is the same as waveform C except that it is delayed in time by an interval *d* as a result of its passage through delay line 26.

Waveforms $E_1$, $E_2$ and $E_3$ represent the signals appearing at the anode of tube 28 for three different sets of conditions. Waveform $E_1$ represents the signal at the anode if the anode supply pulses to tube 28 are of the same durations as the anode supply pulses supplied to tube 10 and if the delay *d* is exactly equal to the repetition period of waveform A. A small plateau is generally present even though the grid of tube 28 is highly positive. A positive pulse appears whenever a negative pulse appears in waveform D. The pulses may be separated from the plateau by proper selection of bias potentials in the stage following tube 10.

Waveform $E_2$ represents an undesirable condition which may exist if for some reason the delay of the delay network 26 is other than an integral multiple of the period of the signals from source 12. If the delay is greater than this period, for example the delay *d'* of Fig. $E_2$, the anode of tube 28 will first rise with the application of the anode pulse from source 12 and then fall as the positive pulse is supplied to the control grid from delay network 26.

Waveform $E_3$ illustrates that the above-mentioned difficulty may be avoided by narrowing the anode supply pulse supplied to tube 28 to the interval limited by the broken lines 36 in waveform A. This insures that the positive signal is supplied to the grid of tube 28 before the anode pulse is applied. The plateau which remains in the signal shown in waveform $E_3$ may be eliminated by proper choice of bias in the stage following tube 28. It should be noted that it is only necessary for source 12 to supply anode supply pulses of two widths. The wider pulses are supplied to stages having positive signals supplied to the control grid and the narrower pulses are supplied to the intermediate stages.

In illustrating the operation of the system of Fig. 1 it has been assumed that the shape of the pulses is preserved in the coupling networks. This is not necessary in all applications of the present invention. In some instances it may be desirable to employ coupling networks which differentiate the pulse signals in order to provide precise control of blocking oscillators, triggered multivibrators or the like. In other embodiments of the invention the delay or storage circuits between the amplifiers may be arranged to broaden each pulse passing therethrough to insure that a signal pulse received by an amplifier will be present for the full duration of the clock pulse. In a circuit arranged in this manner the clock pulse determines the time of occurrence of the leading and trailing edges of the output pulse. Timing pulse source 12 may supply pulses to other circuits in the intervals between the pulses shown in waveform A. Obviously there can be no interference between these other circuits and the circuits supplied by the pulses of waveform A since the various sets of circuits are active at different times. Short bursts of oscillatory energy and pulses having shapes other than rectangular may be amplified in the circuit of Fig. 1. It may be necessary to alter the bias on one or more of the control grids to accommodate other forms of signals but the selection of the appropriate bias is well within the capabilities of a skilled technician. Similarly the anode supply pulses may be other than rectangular.

The circuit of Fig. 1 employs vacuum tubes as the active elements. However, in many instances it will be advantageous to employ transistors as the active elements in order to reduce further the power consumption and number of circuit components required. Fig. 1 shows only a single clocking pulse source and a single source of pulses to be processed. It is within the scope of the invention to apply pulses from several sources to one or more control grids or elements and so arrange the circuit that an output signal is present for any preselected combination of signal pulses and clocking pulses.

Figure 3:
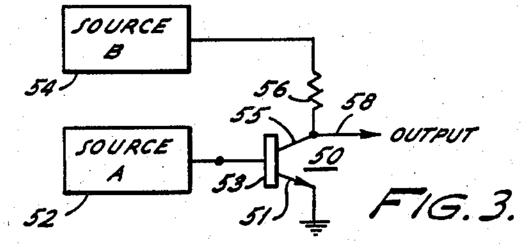
Fig. 3 is a schematic diagram of a second preferred embodiment of the invention.

Fig. 3 illustrates a transistor circuit embodying the principles of the present invention which is capable of performing functions which cannot be duplicated in a single vacuum tube amplifier stage. In Fig. 3 an NPN transistor 50 is arranged so that the emitter 51 is grounded. The base 53 is connected to one source 52 of pulse signals. The collector 55 is connected to a second source 54 of pulse signals through a load resistor 56. A lead 58 from the collector 55 is provided as a means for deriving a signal from the circuit. Again pulse sources 52 and 54 may comprise whole sections of a computer or they may be basic pulse generating circuits. These pulse sources may supply pulses at regular or irregular intervals, but at least some of these pulses from one of the sources must occur in time coincidence with pulses from the other source.

The circuit of Fig. 3 operates in the following manner. The pulses supplied from source 52 to the base 53 are positive and of sufficient amplitude to cause transistor 50 to appear as a short circuit from emitter 51 to collector 55. Therefore output lead 58 will remain substantially at ground potential for the duration of the pulses supplied by source 52 regardless of the signal supplied by source 54. In other words, a positive pulse supplied by source 54 will appear at output lead 58 only in the absence of a positive pulse from source 52. The circuit of Fig. 2 thus acts as an inhibit gate in which one positive pulse inhibits or blocks a positive pulse from another source. Inhibit gate circuits are widely used in computer circuits to provide Boolean (logical) inversion of the function of pulses. The reason that the transistor circuit of Fig. 3 is superior to known forms of vacuum tube circuits is that the plateau found in the waveforms of Fig. 3 are almost completely absent from the output at lead 58 owing to the very low impedance between emitter and collector when the base is supplied with a large positive pulse. A somewhat similar result can be achieved in a multigrid vacuum tube coincidence circuit but such a circuit will only operate on positive pulses and the polarity of the output pulses is the reverse of the polarity of the input pulses.

The circuit of Fig. 3 may be modified to operate with negative pulses by substituting a PNP type transistor for the NPN type shown in Fig. 3. Point contact, junction or surface barrier transistors may be employed in the circuit of Fig. 3.

While there have been described what are at present considered to be the preferred embodiments of the invention it will be apparent that various modifications and other embodiments will occur to those skilled in the art within the scope of the invention. Accordingly we desire the scope of our invention to be limited only by the appended claims.

What is claimed is:

1. A system for processing signals, said system comprising first and second variable impedance elements each having first and second terminals and a control element, the impedance between said first and second terminals of each of said variable impedance elements being a function of the potential of said control element with respect to one of said terminals, a first load impedance having first and second terminals, said second terminal of said first load impedance being connected to said second terminal of said first variable impedance element, means for supplying said signals to be processed to said control element of said first impedance element so as to vary the potential thereof with respect to said one terminal, a second source of constant amplitude pulses, said second source having first and second terminals and being arranged so that one of the pulses supplied thereby occurs in time coincidence with each of said signals to be processed, the duration of each of said pulses from said second source being at least equal to approximately the duration of the pulse to be processed which occurs in time coincidence therewith, the first and second terminals of said second source being connected, respectively, to said first terminal of said first load impedance and said first terminal of said first variable impedance element, a second load impedance having first and second terminals, said second terminal of said second load impedance being connected to said second terminal of said second variable impedance element, a third source of constant amplitude pulses, said third source providing a series of pulses in which selected pulses are spaced by a fixed time delay from pulses of said second source occurring in time coincidence with said signals to be processed, said third source of pulses being connected between said first terminal of said second load impedance and said first terminal of said second variable impedance element, signal delay means having a time delay equal to said fixed time delay, said signal delay means being connected from said second terminal of said first variable impedance element to said control element of said second variable impedance element, and means associated with said second terminal of said second variable impedance element for extracting a signal from said system.

2. A system for amplifying pulses, said system comprising first and second vacuum tubes, each having a cathode, an anode, and a control grid, the cathode of each of said tubes being connected to a point of fixed reference potential, first and second load impedances connected, respectively, to the anodes of said first and second vacuum tubes, a first source of periodic, constant amplitude anode supply pulses connected to said first load impedance, a second source of periodic, constant amplitude anode supply pulses connected to said second load impedance, the duration of each of the pulses provided by said first and second sources being at least equal to approximately the duration of the pulses to be amplified, a delay network connected from the anode of said first vacuum tube to the control grid of said second vacuum tube, said delay network having a delay equal to the delay between the occurrence of a selected pulse from said first source and a selected pulse from said second source, means for supplying the pulses to be amplified to the control grid of said first vacuum tube and means associated with the anode of said second vacuum tube for extracting a signal from said system.

3. A system for processing signals comprising a first variable impedance means and a first load impedance connected in a first series circuit, a second variable impedance means and a second load impedance connected in a second series circuit, each of said variable impedance means being provided with a control element, the impedance of each of said variable impedance means being a function of the potential of said control element with respect to a second point on said variable impedance means, means for supplying said pulses to be processed to said control element of said first variable impedance means so as to vary the potential thereof with respect to said second point on said first variable impedance means, a first source of constant amplitude pulses connected across said first series circuit, said first source being so arranged that one of the pulses supplied thereby occurs in time coincidence with each of said pulses to be processed, the duration of each of the pulses from said first source being at least equal to approximately the duration of the pulse to be processed which occurs in time coincidence therewith, a second source of constant amplitude pulses connected across said second series circuit, said second source being arranged to provide a series of pulses in which selected pulses are spaced by a fixed time delay from pulses of said first source occurring in time coincidence with said pulses to be processed, signal delay means connecting said first series circuit to said control element of said second variable impedance means, said signal delay means being so connected that the potential of said control element of said second variable impedance means is influenced by the signal appearing across the load impedance of said first series circuit, said signal delay means having a time delay equal to said fixed time delay, and means associated with said second load impedance for extracting a signal from said system.

4. A system for processing pulses comprising first and second normally inactive signal processing stages, means for rendering said first signal processing stage active during time intervals of limited duration, said active intervals recurring periodically at a given repetition rate, means for rendering said second signal processing stage active during time intervals of limited duration, said last-mentioned time intervals recurring at the same repetition rate as said first-mentioned time intervals, delay means coupling the output of said first signal processing stage to the input of said second signal processing stage, said delay means having a delay time substantially equal to the time spacing between a selected active time interval of said first stage and a non-coincident active time interval of said second stage, means for supplying a signal to be processed to the input of said first signal processing stage and means for deriving an output signal from the output of said second signal processing stage.

5. A system for processing signals comprising at least three series circuits arranged in cascade, each of said series circuits comprising a variable impedance means and a load impedance connected in series therewith, each of said variable impedance means being provided with a control element, the impedance of each of said variable impedance means being a function of the potential of said control element with respect to a second point on said variable impedance means, a first source of constant amplitude pulses connected across the first and each additional odd-numbered series circuit in said cascade arrangement, said first source being so arranged that one of the pulses supplied thereby occurs in time coincidence with each of the pulses to be processed, the duration of each of the pulses from said first source being at least equal to approximately the duration of the pulses to be processed which occur in time coincidence therewith, a second source of constant amplitude pulses connected across the second series circuit and each additional even-numbered series circuit, if any, in said cascade arrangement, said second source being arranged to provide a series of pulses in which selected pulses are spaced by a fixed time interval from pulses of said first source which occur in time coincidence with said pulses to be processed, a first series of signal delay means, each delay means of said first series connecting a corresponding odd-numbered series circuit to said control element of the variable impedance means in the following even-numbered series circuit, said signal delay means being so connected that the potential of said control element of the following even-numbered variable impedance means is influenced by the signal appearing across the load impedance of the preceding odd-numbered series circuit, said signal delay means having a time delay equal to said fixed time interval, a second series of delay means, each delay means of said second series connecting a corresponding even-numbered series circuit to the control element of the variable impedance means in the following odd-numbered series circuit, said signal delay means of said second series being so connected that the potential of said control element of said variable impedance means of the following stage is influenced by the signal appearing across the load impedance of the preceding stage, said signal delay means of said second series each having a time delay equal to the difference between the time delay of said delay means of said first series and an integral number of periods of said pulses from said first source of constant amplitude pulses, means for supplying said pulses to be processed to the control element of the variable impedance means of the first series circuit so as to vary the potential thereof with respect to said second point on that variable impedance means, and means associated with a load impedance of one of said series circuits for extracting an output signal from said system.

6. A system for processing signals as defined by claim 5 wherein constant amplitude pulses supplied by said second source are of shorter duration than the pulses supplied by said first source.

References Cited in the file of this patent

UNITED STATES PATENTS

| | | |
|---|---|---|
| 2,483,766 | Hansell | Oct. 4, 1949 |
| 2,533,552 | Brinster et al. | Dec. 12, 1950 |
| 2,554,987 | Hogle | May 29, 1951 |
| 2,572,080 | Wallace | Oct. 23, 1951 |
| 2,599,675 | Volz | June 10, 1952 |
| 2,635,229 | Gloess et al. | Apr. 14, 1953 |
| 2,680,152 | Creamer, Jr. | June 1, 1954 |